(12) United States Patent
Ito et al.

(10) Patent No.: US 7,612,142 B2
(45) Date of Patent: Nov. 3, 2009

(54) MATERIALS HAVING CROSSLINKED POLYROTAXANE AND PROCESS FOR PRODUCING THE SAME

(75) Inventors: Kohzo Ito, Tokyo (JP); Jun Araki, Tokyo (JP)

(73) Assignee: The University of Tokyo, Bunkyo-ku, Tokyo (JP)

( * ) Notice: Subject to any disclaimer, the term of this patent is extended or adjusted under 35 U.S.C. 154(b) by 0 days.

(21) Appl. No.: 11/579,842

(22) PCT Filed: May 6, 2005

(86) PCT No.: PCT/JP2005/008346

§ 371 (c)(1), (2), (4) Date: Sep. 9, 2008

(87) PCT Pub. No.: WO2005/108464

PCT Pub. Date: Nov. 17, 2005

(65) Prior Publication Data

US 2009/0011933 A1 Jan. 8, 2009

(30) Foreign Application Priority Data

May 7, 2004 (JP) ............... 2004-138039
Aug. 30, 2004 (JP) ............... 2004-249828

(51) Int. Cl.
*C08G 63/48* (2006.01)
(52) U.S. Cl. ............... 525/54.4; 525/54.44; 525/54.45
(58) Field of Classification Search ............... 525/54.4, 525/54.44, 54.45
See application file for complete search history.

(56) References Cited

U.S. PATENT DOCUMENTS

| | | | | |
|---|---|---|---|---|
| 5,538,655 | A * | 7/1996 | Fauteux et al. | 252/62.2 |
| 6,100,329 | A * | 8/2000 | Gibson et al. | 525/55 |
| 6,527,887 | B1 * | 3/2003 | Ruebner et al. | 149/108 |
| 6,828,378 | B2 | 12/2004 | Okumura et al. | |
| 7,151,152 | B2 * | 12/2006 | Takata et al. | 528/73 |
| 7,186,355 | B2 * | 3/2007 | Swager | 252/500 |
| 2003/0124168 | A1 | 7/2003 | Yui et al. | |
| 2003/0138398 | A1 * | 7/2003 | Okumura et al. | 424/78.38 |
| 2003/0171573 | A1 | 9/2003 | Yui et al. | |
| 2004/0157989 | A1 | 8/2004 | Bruhn | |
| 2004/0162275 | A1 * | 8/2004 | Yui et al. | 514/183 |

FOREIGN PATENT DOCUMENTS

| | | |
|---|---|---|
| EP | 1283218 A1 | 2/2003 |
| JP | 2810264 B2 | 2/1994 |
| WO | WO 03/074099 A1 | 9/2003 |

OTHER PUBLICATIONS

Ichi, T., et al., "Preparation and Characterization of Three-Dimensional Architecture Based on Polyrotaxane Structure," *The 12th Bioengineering Conference 1999 Annual Meeting of BE D/JSME*, No. 99-37, Ishikawa, Japan, Jan. 11 and 12, 2000 (published Jan. 5, 2000), pp. 217-218 [with English translation of three pages].

Okumura, Y., and K. Ito, "The Polyrotaxane Gel: A Topological Gel by Figure-of-Eight Cross-links," *Advanced Materials* 13(7):485-487, Apr. 4, 2001.

Joung, Y.K., et al., "Anticoagulant Supramolecular-Structured Polymers: Synthesis and Anti Coagulant Activity of Taurine-Conjugated Carboxyethylester-Polyrotaxanes," Science and Technology of Advanced Materials, 6(5):484-490, Jul. 2005.

Notice of Allowance dated May 19, 2009, from U.S. Appl. No. 10/594,970, filed Jun. 27, 2007.

Ooya, T., et al., "Supramolecular Design for Multivalent Interaction: Maltose Mobility Along Polyrotaxane Enhanced Binding With Concanavalin A," Journal of the American Chemical Society 125(43):13016-13017, Oct. 2003.

Park, H.D., et al., "Anticoagulant Activity of Sulfonated Polyrotaxanes as Blood-Compatible Materials," Journal of Biomedical Materials Research, Part A 60(1):186-190, Jan. 2002.

(Continued)

*Primary Examiner*—Bernard Lipman
(74) *Attorney, Agent, or Firm*—Christensen O'Connor Johnson Kindness PLLC

(57) ABSTRACT

A material having crosslinked polyrotaxane which has further improved swelling properties, especially one having a crosslinked polyrotaxane which changes in swelling property with change in pH; and a material having a crosslinked polyrotaxane which is responsive especially at a high speed to a change of the surrounding electric field. The materials have a crosslinked polyrotaxane comprising at least two polyrotaxane molecules which each comprises cyclic molecules, a linear molecule which includes the cyclic molecules in cavities of cyclic molecules in a skewered manner, and capping groups, each of which locates at each end of the linear molecule in order to prevent the dissociation of the cyclic molecules, the least two polyrotaxane molecules having been bound to each other through a chemical bonding between the cyclic molecules thereof, wherein the cyclic molecules have hydroxy groups (—OHs) and part of the hydroxy groups are substituted with a group having an ionic group.

19 Claims, 2 Drawing Sheets

OTHER PUBLICATIONS

Park, H.D., et al., "In Vitro Biocompatibility Assessment of Sulfonated Polyrotaxane-Immobilized Polyurethane Surfaces," Journal of Biomedical Materials Research, 66A(3):596-604, Jan. 2003.

Supplemental Notice of Allowability dated Jul. 10, 2009, from U.S. Appl. No. 10/594,970, filed Jun. 27, 2007.

Supplementary European Search Report dated May 7, 2009, issued in corresponding Application No. EP 05737331, filed May 6, 2005.

Watanabe, J., et al., "Effect of Acetylation of Biodegradable Polyrotaxanes on its Supramolecular Dissociation Via Terminal Ester Hydrolysis," Journal of Biomaterials Science, Polymer Edition, 10(12):1275-1288, 1999.

* cited by examiner

MATERIALS HAVING CROSSLINKED POLYROTAXANE AND PROCESS FOR PRODUCING THE SAME

TECHNICAL FIELD

The present invention relates to a material comprising a crosslinked polyrotaxane in which polyrotaxanes are crosslinked, and a method for producing the material. In particular, the present invention relates to a material comprising a crosslinked polyrotaxane in which an OH group(s) of a cyclic molecule in the polyrotaxane is substituted with an ionic group(s), and a method for producing the material.

BACKGROUND ART

Polyrotaxane is comprised of a pseudopolyrotaxane, which comprises a linear molecule (axis) and a cyclic molecule(s) (rota) in which the linear molecule is included in cavity (cavities) of the cyclic molecule(s) in a skewered manner, and capping groups, each of which locates at each end of the pseudopolyrotaxane (each end of the linear molecule) in order to prevent the dissociation of the cyclic molecule(s). For example, a polyrotaxane having α-cyclodextrin(s) (hereinafter cyclodextrin may be simply abbreviated as "CD") as the cyclic molecule(s), and polyethylene glycol (hereinafter may be abbreviated as "PEG") as the linear molecule has been intensively studied in recent years for its various characteristics (for example, see Patent Document 1).

Further, Patent Document 2 discloses a compound comprising a crosslinked polyrotaxane having a property of a so-called slipping gel or sliding gel, or a property of viscoelastic material. In particular, Patent Document 2 specifically discloses crosslinked polyrotaxane in which polyrotaxanes, each of which comprises α-CD(s) as the cyclic molecule(s) and PEG as the linear molecule which is included in the α-CD(s), are crosslinked (bound) through a chemical binding.

A material comprising a crosslinked polyrotaxane is required to have further improved swelling property. For example, a material comprising a cross linked polyrotaxane which significantly changes in swelling property with change in an environment surrounding the crosslinked polyrotaxane, especially changes in an environmental pH and/or ionic strength, is required. A material comprising a crosslinked polyrotaxane which is responsive especially at a high speed to change in the surrounding electric field is also required.

Patent Document 1: Japanese Patent No. 2810264.

Patent Document 2: Japanese Patent No. 3475252.

DISCLOSURE OF THE INVENTION

Problem to be solved by the Invention

An object of the present invention is to solve the problem described above.

Specifically, an object of the present invention is to provide a material comprising a crosslinked polyrotaxane which has further improved swelling property, especially across linked polyrotaxane which changes in swelling property with changes in pH and/or ionic strength.

Further, an object of the present invention is, other than or in addition to the above-described object, to provide a material comprising a crosslinked polyrotaxane which is responsive, especially at a high speed, to change in the surrounding electric field.

Means for solving Problem

From the result of the extensive investigations to achieve the object(s), the present inventors have found that, by substituting at least a part of hydroxy groups in the cyclic molecule(s) which constitutes polyrotaxane with a group having an ionic group, it is possible to control properties of the crosslinked polyrotaxane, in particular, swelling properties, i.e., an ability to absorb solvent(s), change in swelling properties (volume) by pH and/or ionic strength, change in behavior in electric field.

Specifically, the present inventors have found that following inventions can solve the above-described problem(s).

<1> A material comprising a crosslinked polyrotaxane, wherein the crosslinked polyrotaxane comprises at least two molecules of a polyrotaxane, which comprises a cyclic molecule, a linear molecule which is included in cavity (cavities) of the cyclic molecule(s) in a skewered manner, and a capping group which is located at each end of the linear molecule to prevent the dissociation of the cyclic molecules;

the cyclic molecules in the at least two polyrotaxane molecules are bound to each other through a chemical bonding; and the cyclic molecule has a hydroxy group(s) (—OH (s), and a part of the hydroxy group(s) is substituted with a group having at least one ionic group selected from the group consisting of a —COOX group (wherein X represents a hydrogen atom (H), an alkaline metal or a mono-valent metal), an —$SO_3$X group (wherein X has the same definition as described above), an —$NH_2$ group, an —$NH_3$X' group (wherein X' represent a monovalent halogen ion) a —$PO_4$ group, and an —$HPO_4$ group.

<2> In the above item <1>, 10 to 90%, preferably 20 to 80%, more preferably 30 to 70% of the total hydroxy groups of the total cyclic molecules may be substituted with the group having the ionic group(s).

<3> In the above item <1> or <2>, the material may absorb a solvent in an amount of 1000 g or more, preferably 2000 g or more, more preferably 4000 g or more per 1 g of the crosslinked polyrotaxane in an absolutely dried state.

<4> In any one of the above items <1> to <3>, the material may absorb a solvent containing water, and the material may change in volume with changes in pH and/or ionic strength of the solvent. For example, at pH 2, the material may absorb 5 g or more, preferably 10 g or more, and more preferably 50 g or more per 1 g of the absolutely dried crosslinked polyrotaxane, while at pH 10, the material may absorb 500 g or more, preferably 1000 g or more, and more preferably 2000 g or more per 1 g of the absolutely dried crosslinked polyrotaxane. Also, at $10^{-1}$ mol/L of ionic strength, the material may absorb 5 g or more, preferably 10 g or more, and more preferably 50 g or more per 1 g of the absolutely dried crosslinked polyrotaxane, while at $10^{-3}$ mol/L of ionic strength, the material may absorb 200 g or more, preferably 500 g or more, and more preferably 1000 g or more per 1 g of the absolutely dried crosslinked polyrotaxane.

<5> In any one of the above items <1> to <4>, the material may absorb a solvent containing water, and the material having absorbed the solvent may change in shape and/or volume by an electric field. Specifically, the material may change in shape and/or volume, for example flex, by localization of the cationic cyclic molecule to the negative electrode when the ionic group is cationic, or by localization of the anionic cyclic molecule to the positive electrode when the ionic group is anionic, by the electric field.

<6> In any one of the above items <1> to <5>, the cyclic molecule may be a cyclodextrin molecule.

<7> In any one of the above items <1> to <5>, the cyclic molecule may be a cyclodextrin molecule, and the cyclodextrin molecule may be selected from the group consisting of α-cyclodextrin, β-cyclodextrin and γ-cyclodextrin.

<8> In any one of the above items <1> to <7>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<9> In any one of the above items <1> to <8>, the capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<10> In any one of the above items <1> to <9>, the cyclic molecule may be α-cyclodextrin, and the linear molecule may be polyethylene glycol.

<11> In any one of the above items <1> to <10>, the linear molecule may have the cyclic molecule included in a skewered manner at an amount of 0.001 to 0.6, preferably 0.01 to 0.5, more preferably 0.05 to 0.4 of a maximum inclusion amount, which is defined as an amount at which the cyclic molecule can be included at maximum when the linear molecule has the cyclic molecules included in a skewered manner, and the amount at maximum is normalized to be 1.

<12> In any one of the above items <1> to <9>, at least two molecules of polyrotaxanes may be chemically bound to each other by a crosslinking agent.

<13> In any one of the above items <1> to <12>, the crosslinking agent may have a molecular weight of less than 2,000, preferably less than 1,000, more preferably less than 600, most preferably less than 400.

<14> In the above item <12> or <13>, the crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

<15> In any one of the above items <1> to <14>, at least one hydroxyl group of at least one cyclic molecule in each of the at least two molecules of polyrotaxane may be involved in crosslinking.

<16> In any one of the above items <1> to <15>, the linear molecule may have a molecular weight of 10,000 or more, preferably 20,000 or more, more preferably 35,000 or more.

<17> A method for preparing a material which comprises a crosslinked polyrotaxane comprising the steps of:

1) preparing a pseudopolyrotaxane in which a linear molecule is included in the cavity (cavities) of a cyclic molecule(s) each having an OH group in a skewered manner by mixing the cyclic molecule(s) and the linear molecule;

2) preparing a polyrotaxane by capping each end of the pseudopolyrotaxane with a capping group to prevent the dissociation of the cyclic molecule(s); and 3) crosslinking at least two molecules of polyrotaxane via chemical bonding of the cyclic molecule(s) in the at least two molecules of polyrotaxane through chemical-bonding;

and further comprising the step of substituting a part of OH groups of the cyclic molecule(s) with an ionic group:

A) before the step 1) of preparing a pseudopolyrotaxane;

B) after the step 1) of preparing a pseudopolyrotaxane and before the step 2) of preparing a polyrotaxane;

C) after the step 2) of preparing a polyrotaxane and before the step 3) of crosslinking; and/or D) after the step 3) of cross-linking.

<18> A method for preparing a material which comprises a crosslinked polyrotaxane comprising the steps of:

1) preparing a pseudopolyrotaxane in which a linear molecule is included in the cavity (cavities) of a cyclodextrin molecule(s) in a skewered manner by mixing the linear molecule and the cyclodextrin molecule(s);

2) preparing a polyrotaxane by capping each end of the pseudopolyrotaxane with a capping group to prevent the dissociation of the cyclodextrin molecule(s); and 3) crosslinking at least two molecules of polyrotaxane via chemical bonding of the cyclodextrin molecules in the at least two molecules of polyrotaxane through chemical bonding;

and further comprising the step of substituting a part of OH groups of the cyclodextrin molecules with an ionic group:

A) before the step 1) of preparing a pseudopolyrotaxane;

B) after the step 1) of preparing a pseudopolyrotaxane and before the step 2) of preparing a polyrotaxane;

C) after the step 2) of preparing a polyrotaxane and before the step 3) of crosslinking; and/or D) after the step 3) of cross-linking.

<19> In the above item <17> or <18>, the step of substituting may be set after the step 2) of preparing a polyrotaxane and before the step 3) of cross-linking.

<20> In any one of the above items <17> to <19>, the ionic group may be at least one selected from the group consisting of a —COOX group (wherein X represents a hydrogen atom (H), an alkaline metal, or a monovalent metal), an —SO$_3$X group (wherein X has the same definition as described above), an —NH$_2$ group, an —NH$_3$X' group (wherein X' represent a monovalent halogen ion) a —PO$_4$ group and an —HPO$_4$ group.

<21> In any one of the above items <17> to <20>, 10 to 90%, preferably 20 to 80%, more preferably 30 to 70% of the total hydroxy groups of the total cyclic molecules may be substituted with the group having the ionic group.

<22> In any one of the above items <17> to <21>, the material may absorb a solvent in an amount of 1000 g or more, preferably 2000 g or more, more preferably 4000 g or more per 1 g of the crosslinked polyrotaxane in an absolutely dried state.

<23> In any one of the above items <17> to <22>, the material may absorb a solvent containing water, and the material may change in volume with changes in pH and/or ionic strength of the solvent. For example, at pH 2, the material may absorb 5 g or more, preferably 10 g or more, and more preferably 50 g or more per 1 g of the absolutely dried crosslinked polyrotaxane, while at pH 10, the material may absorb 500 g or more, preferably 1000 g or more, and more preferably 2000 g or more per 1 g of the absolutely dried crosslinked polyrotaxane. Also, at $10^{-1}$ mol/L of ionic strength, the material may absorb 5 g or more, preferably 10 g or more, and more preferably 50 g or more per 1 g of the absolutely dried crosslinked polyrotaxane, while at $10^{-3}$ mol/L of ionic strength, the material may absorb 200 g or more, preferably 500 g or more, and more preferably 1000 g or more per 1 g of the absolutely dried crosslinked polyrotaxane.

<24> In any one of the above items <17> to <23>, the material may absorb a solvent containing water, and the material having absorbed the solvent may change in shape and/or volume by an electric field. Specifically, the material may change in shape and/or volume, for example flex, by localization of the cationic cyclic molecule to the negative electrode when the ionic group is cationic, or by localization of the anionic cyclic molecule to the positive electrode when the ionic group is anionic, by the electric field.

<25> In any one of the above items <17> to <24>, the cyclic molecule may be a cyclodextrin molecule.

<26> In any one of the above items <17> to <24>, the cyclic molecule may be a cyclodextrin molecule, and the cyclodextrin molecule may be selected from the group consisting of α-cyclodextrin, β-cyclodextrin and γ-cyclodextrin.

<27> In any one of the above items <17> to <26>, the linear molecule may be selected from the group consisting of polyethylene glycol, polyisoprene, polyisobutylene, polybutadiene, polypropylene glycol, polytetrahydrofuran, polydimethylsiloxane, polyethylene and polypropylene.

<28> In any one of the above items <17> to <27>, the capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<29> In any one of the above items <17> to <28>, the cyclic molecule may be α-cyclodextrin, and the linear molecule may be polyethylene glycol.

<30> In any one of the above items <17> to <29>, the linear molecule may have the cyclic molecule included in a skewered manner at an amount of 0.001 to 0.6, preferably 0.01 to 0.5, more preferably 0.05 to 0.4 of a maximum inclusion amount, which is defined as an amount at which the cyclic molecule can be included at maximum when the linear molecule has the cyclic molecules included in a skewered manner, and the amount at maximum is normalized to be 1.

<31> In any one of the above items <17> to <30>, at least two molecules of polyrotaxanes may be chemically bound to each other by a crosslinking agent.

<32> In the above item <31>, the crosslinking agent may have a molecular weight of less than 2,000, preferably less than 1,000, more preferably less than 600, most preferably less than 400.

<33> In the above item <31> or <32>, the crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

<34> In any one of the above items <17> to <33>, at least one OH group of at least one cyclic molecule in each of the at least two molecules of polyrotaxane may be involved in crosslinking.

<35> In any one of the above items <17> to <34>, the linear molecule may have a molecular weight of 10,000 or more, preferably 20,000 or more, more preferably 35,000 or more.

EFFECTS OF THE INVENTION

The present invention can provide a material comprising a crosslinked polyrotaxane which has further improved swelling property, especially a crosslinked polyrotaxane which changes in swelling property with changes in pH and/or ionic strength.

Further, the present invention, other than or in addition to the above-described effect, can provide a material comprising a crosslinked polyrotaxane which is responsive, especially at a high speed, to change in the surrounding electric field.

PREFERRED EMBODIMENTS FOR CARRYING OUT THE PRESENT INVENTION

The present invention will be described in detail hereinafter.

The present invention provides a material comprising a crosslinked polyrotaxane comprising at least two molecules of polyrotaxane, which comprises a cyclic molecule(s), a linear molecule which is included in cavities of the cyclic molecule (s) in a skewered manner, and a capping group which is located at each end of the linear molecule to prevent the dissociation of the cyclic molecules, in which the cyclic molecules in the at least two polyrotaxane molecules are bonded to each other through a chemical bond, and in which the cyclic molecule (s) have a hydroxy group(s) (—OH(s)) and a part of the hydroxy group(s) is substituted with a group having an ionic group.

The ionic group in the material according to the present invention is not specifically limited as long as it has ionic property. Examples of the ionic group may include a —COOX group (wherein X represents a hydrogen atom (H), an alkaline metal or a monovalent metal), a —SO$_3$X group (wherein X has the same definition as described above), an —NH$_2$ group, an —NH$_3$X' group (X' represents a monovalent halogen ion), a —PO$_4$ group, an —HPO$_4$ group and the like. The ionic group may be at least one selected from the group consisting those described above.

10 to 90%, preferably 20 to 80%, and more preferably 30 to 70% of the total hydroxy groups of the total cyclic molecules may be substituted with the group having the ionic group.

The material according to the present invention has the following effect because of the ionic group: The material has improved solvent-absorbing property and/or swelling property due to its increased hydration ability or hydrophilicity because of the ionic group.

In addition, the cyclic molecule having the ionic group on the linear molecule will change in dispersibility with change in water contained in the material, or pH and/or ionic strength of water contained in the material. With the change in dispersibility of the cyclic molecule, the material will change in solvent-absorbing property and/or swelling property. Specifically, when the ionic group is cationic, the higher pH leads to the lower solvent-absorbing property and/or swelling property. On the contrary, when the ionic group is anionic, the higher pH leads to the larger solvent-absorbing property and/or swelling property.

Further, when the material is placed under an electric field, the following phenomena will be thought to occur by the electric field.

For example, by the electric field, 1) the cyclic molecule having the ionic group on the linear molecule will change in dispersibility. The change in dispersibility results in changes in shape and/or volume of the material. Specifically, when the ionic group is cationic, a cationic cyclic molecule is localized to the negative electrode side. On the contrary, when the ionic group is anionic, an anionic cyclic molecule is localized to the positive electrode side. Such localization will lead change in the shape and/or volume of the material. More specifically, by localization of the cyclic molecule, stretchability of the crosslinked polyrotaxane is restricted. Accordingly, a part of the material in which the cyclic molecule is localized shrinks, while the other part does not shrink. Consequently, change in the shape of the material such as flection of the material can be brought.

Alternatively, 2) when there are ions in the electric field in which the material is placed, the ions in the material will be migrated by the electric field to generate localized ionic strength in the material. The material has different swelling ratio depending on the ionic strength. For example, when the ionic strength is large, the material has small swelling ratio, while when the ionic strength is small, the material has large swelling ratio. Accordingly, the generated ionic strength localized in the material can result in swelling ratio localized in the material and bring a change in the shape of the material such as flection of the material.

The material according to the present invention may absorb a solvent in an amount of 1000 g or more, preferably 2000 g or more, and more preferably 4000 g or more per 1 g of absolutely dried crosslinked polyrotaxane.

The material according to the present invention may particularly absorb a solvent containing water, and may change in volume with changes in pH and/or ionic strength of the solvent. For example, at pH 2, the material may absorb 5 g or more, preferably 10 g or more, and more preferably 50 g or more per 1 g of the absolutely dried crosslinked polyrotaxane, while at pH 10, the material may absorb 500 g or more, preferably 1000 g or more, and more preferably 2000 g or more per 1 g of the absolutely dried crosslinked polyrotaxane. Also, at $10^{-1}$ mol/L of ionic strength, the material may absorb 5 g or more, preferably 10 g or more, and more preferably 50 g or more per 1 g of the absolutely dried crosslinked polyrotaxane, while at $10^{-3}$ mol/L of ionic strength, the material may absorb 200 g or more, preferably 500 g or more, and more preferably 1000 g or more per 1 g of the absolutely dried crosslinked polyrotaxane.

Moreover, the material according to the present invention may absorb a solvent containing water, and the material having absorbed the solvent may change in shape and/or volume by an electric field. Specifically, the material may change in shape and/or volume, for example flex, by localization of the cationic cyclic molecule to the negative electrode when the ionic group is cationic, or by localization of the anionic cyclic molecule to the positive electrode when the ionic group is anionic, by the electric field.

In the material according to the present invention, the cyclic molecule may be a cyclodextrin molecule. The cyclodextrin molecule may be selected from the group consisting of α-cyclodextrin, β-cyclodextrin and γ-cyclodextrin, in particular, α-cyclodextrin molecule.

The linear molecule in the material according to the present invention may be polyethylene glycol, polyisoprene, polyisobutylene, polybutadiene, polypropylene glycol, polytetrahydrofuran, polydimethylsiloxane, polyethylene and polypropylene, preferably polyethylene glycol.

A molecular weight of the linear molecule according to the present invention may be 10,000 or more, preferably 20,000 or more, more preferably 35,000 or more.

The capping group in the material according to the present invention may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

In the material according to the present invention, the linear molecule may have the cyclic molecules included in a skewered manner at an amount of 0.001 to 0.6, preferably 0.01 to 0.5, and more preferably 0.05 to 0.4 of a maximum inclusion amount, which is defined as an amount at which the cyclic molecule can be included at maximum when the linear molecule has the cyclic molecules included in a skewered manner, and the amount at maximum is normalized to be 1. When the inclusion amount of a cyclic molecule is near the maximum value, there occurs a tendency that the moving distance of the cyclic molecule on the linear molecule is limited. When the moving distance is limited, a tendency of limitation of the degree of change in volume of the material occurs undesirably.

The maximum inclusion amount of a cyclic molecule can be determined depending on the length of a linear molecule and the thickness of a cyclic molecule. For example, when the linear molecule is polyethylene glycol and the cyclic molecule is an α-cyclodextrin molecule, the maximum inclusion amount is measured experimentally (see, Macromolecules 1993, 26, 5698-5703, whole contents of which is incorporated herein).

In the material according to the present invention, at least two polyrotaxanes may be chemically bound to each other by a crosslinking agent.

The crosslinking agent may have a molecular weight of less than 2,000, preferably less than 1,000, more preferably less than 600, and most preferably less than 400.

The crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinyl sulfone, 1,1'-carbonyldiimidazole and alkoxysilanes.

In the material according to the present invention, the at least one hydroxyl group of at least one cyclic molecule in each of the at least two molecules of polyrotaxane may be involved in crosslinking.

The material comprising a crosslinked polyrotaxane according to the present invention can be prepared, for example, as follows: The material can be prepared by a method comprising the steps of:

1) preparing a pseudopolyrotaxane in which a linear molecule is included in cavity (cavities) of a cyclodextrin molecule(s) in a skewered manner by mixing the cyclodextrin molecule(s) and the linear molecule;

2) preparing a polyrotaxane by capping each end of the pseudopolyrotaxane with a capping group to prevent the dissociation of the cyclodextrin molecule(s); and 3) cross-linking at least two molecules of polyrotaxane by bonding respective the cyclodextrin molecule(s) in the at least two molecules of polyrotaxane through chemical bonding; and the method further comprises the step of substituting a part of OH groups of the cyclodextrin molecule (s) with anionic group:

A) before the step 1) of preparing a pseudopolyrotaxane;
B) after the step 1) of preparing a pseudopolyrotaxane and before the step 2) of preparing a polyrotaxane;
C) after the step 2) of preparing a polyrotaxane and before the step 3) of cross-linking; and/or
D) after the step 3) of cross-linking.

The step of substituting a part of OH groups of the cyclic molecule(s) with an ionic group may be set at any timing of A) to D), or may be set at any two or more timing of A) to D).

In the preparation method described above, as the cyclic molecules, the linear molecule, the capping group and the like to be used, those described above may be used.

The step of substituting may be preferably set after the step 2) of preparing a polyrotaxane and before the step 3) of cross-linking.

Conditions used in the step of substituting, which depends on an ionic group to be used for substitution, is not specifically limited, and various reaction methods and conditions may be employed. For example, when using a carboxyl group as a kind of the ionic group, examples of the method may include, but are not limited to, oxidation of a primary hydroxy group, ether derivatization of primary and secondary hydroxy groups (including carboxymethylation, carboxyethylation and the like) addition of succinic anhydride, maleic anhydride and/or derivatives thereof, and the like.

The present invention will be illustrated more specifically by way of the following Examples, but is not limited thereby.

EXAMPLE 1

Preparation of Carboxyl Group-Introduced Polyrotaxane (Carboxymethylated Polyrotaxane)

A polyrotaxane comprising polyethyleneglycol (molecular weight: 35,000) and α-CD molecules, in which the polyethylene glycol skewers 90 to 100 α-CD molecules (inclusion amount: approximately 25%) was prepared (wherein, a capping group was an adamantane group). 1 g of the polyrotaxane was dissolved in 80 ml of dimethylsulfoxide (DMSO). To the resulting solution was added 10 g of sodium hydroxide in the fine powder state portionwise, and then stirred hard for 1 hour under Ar atmosphere in order to be well dispersed to prepare a polyrotaxane preparation. Alternatively, a solution of 0.8 g of monochloroacetic acid (or sodium monochloroacetate) in 20 ml of DMSO was prepared. To the polyrotaxane preparation was added the solution dropwise, and reacted overnight at room temperature. After the reaction ended, the reaction mixture was poured dropwise into 300 to 400 ml of pure water with stirring hard, and excess sodium hydroxide was immediately neutralized with 50 ml of 5N hydrochloric acid. The sample was purified by dialysis against pure water, and freeze-dried to give 1.19 g of carboxymethylated polyrotaxane (PR-1) in which a part of —OH groups of α-CD(s) was substituted with a —$CH_2COOH$ group.

EXAMPLE 2

Preparation 1 of Sulfonic Group-Introduced Polyrotaxane (Sulfoethylated Polyrotaxane)

A polyrotaxane preparation was prepared in a manner similar to Example 1. Alternatively, a solution of 1.8 g of sodium bromoethanesulfonate in 20 ml of DMSO was prepared. To the polyrotaxane preparation was added the solution dropwise, and reacted overnight at room temperature. After the reaction ended, the reaction mixture was poured dropwise into 300 to 400 ml of pure water with stirring hard, and excess sodium hydroxide was immediately neutralized with 50 ml of 5N hydrochloric acid. The sample was purified by dialysis with pure water and freeze-dried to give 0.96 g of sulfoethylated polyrotaxane (PR-2) in which a part of —OH groups of α-CD(s) was substituted with a —$(CH_2)_2$—$SO_3Na$ group.

EXAMPLE 3

Preparation 2 of Sulfonic Group-Introduced Polyrotaxane (Sulfoethylated Polyrotaxane)

A polyrotaxane preparation was prepared in a manner similar to Example 1, except that a molecular weight of polyethylene glycol in the polyrotaxane was 500,000 (amount of α-CD: approximately 1500, inclusion amount of α-CD: approximately 25%). Alternatively, a solution of 2 g of sodium bromoethanesulfonate in 20 ml of DMSO was prepared. To the polyrotaxane preparation was added the solution dropwise, and reacted overnight at room temperature. After the reaction ended, the reaction mixture was poured dropwise into 300 to 400 ml of pure water with stirring hard, and excess sodium hydroxide was immediately neutralized with 50 ml of 5N hydrochloric acid. The sample was purified by dialysis with pure water, and freeze-dried to give 0.90 g of sulfoethylated polyrotaxane (PR-2') in which a part of —OH groups of α-CD(s) was substituted with a —$(CH_2)_2$—$SO_3Na$ group.

EXAMPLE 4

Preparation of Amino Group-Introduced Polyrotaxane (Aminoethylated Polyrotaxane)

A polyrotaxane preparation was prepared in a manner similar to Example 1. Alternatively, a solution of 3 g of bromoethylammonium bromide in 20 ml of DMSO was prepared. To the polyrotaxane preparation was added the solution dropwise, and reacted overnight at room temperature. After the reaction ended, the reaction mixture was poured dropwise into 300 to 400 ml of pure water with stirring hard, and excess sodium hydroxide was immediately neutralized with 5N hydrochloric acid. The sample was purified by dialysis with pure water, and freeze-dried to give 0.90 g of aminoethylated polyrotaxane (PR-3) in which apart of —OH groups of α-CD(s) was substituted with a —$(CH_2)_2$—$NH_2$ group.

EXAMPLE 5

Preparation of Crosslinked Polyrotaxane from Carboxymethylated Polyrotaxane Pr-1, and Properties Thereof 250 mg of carboxymethylated polyrotaxane PR-1 was dissolved in 1 mL of a 0.1N NaOH aqueous solution. Then, to the resulting solution was added 20 μL of divinyl sulfone in order to crosslink. The reaction was allowed to stand for 1 hour to confirm gelation, and then repeatedly immersed in a large amount of a saline solution (0.01 to 0.1N) to remove unreacted reagents and NaOH, and thereby to obtain a crosslinked carboxymethylated polyrotaxane CPR-1.

The cross linked carboxymethylated polyrotaxane CPR-1 was immersed in pure water to swell. CPR-1 was allowed to swell to an equilibrium state by repeatedly replacing the surrounding pure water. After CPR-1 swelled to the fullest, it was placed on a 120×132-mesh nylon mesh for 10 minutes to drain water off, and then weight w1 was measured. The resultant swollen material was freeze-dried and then weight w2 was measured.

A swelling ratio Q (Q=w1/w2) was 2678.

EXAMPLE 6

Preparation of Crosslinked Polyrotaxane from Sulfoethylated Polyrotaxane PR-2, and Properties Thereof 250 mg of sulfoethylated polyrotaxane PR-2 was dissolved in 1 mL of a 0.1N NaOH aqueous solution. To the resulting solution was added 20 μL of divinyl sulfone to crosslink. The reaction was allowed to stand for 1 hour to confirm gelation, and then repeatedly immersed in a large amount of a saline solution (0.01 to 0.1N) to remove unreacted reagents and NaOH, and thereby to obtain a crosslinked sulfoethylated polyrotaxane CPR-2.

The crosslinked sulfoethylated polyrotaxane CPR-2 was immersed in pure water to swell. CPR-2 was allowed to swell to an equilibrium state by repeatedly replacing the surrounding pure water. After CPR-2 swelled to the fullest, it was placed on a 40-mesh net for 10 minutes to drain water off, and then weight w1 was measured. The resultant swollen material was freeze-dried and then weight w2 was measured.

A swelling ratio Q (Q=w1/w2) was 851.

EXAMPLE 7

Preparation of Crosslinked Polyrotaxane from Sulfoethylated Polyrotaxane PR-2', and Properties Thereof 150 mg of sulfoethylated polyrotaxane PR-2' was dissolved in 1 mL of DMSO. To the resulting solution was added 30 mg of carbonyldiimidazole, and stirred well. Then, the reaction was defoamed under reduced pressure and allowed to stand for 1 to 3 days at 50° C. to crosslink. After the reaction mixture was confirmed to gelate, it was repeatedly immersed in a large amount of a saline solution (0.01 to 0.1N) to remove unreacted reagents and DMSO, and thereby to obtain a crosslinked sulfoethylated polyrotaxane CPR-2'.

EXAMPLE 8

Swelling Ratio of Crosslinked Polyrotaxane Prepared from Sulfoethylated Polyrotaxane PR-2': Variation with Ionic Strength Each sample of the crosslinked sulfoethylated polyrotaxane CPR-2' obtained in Example 7 was repeatedly immersed in 1 wt %, 0.1 wt % or 0.01 wt % of an NaCl aqueous solution, and allowed to swell to an equilibrium state. After the sample swelled to the fullest, it was placed on a 120×132-mesh nylon mesh for 10 minutes to drain water off, and then weight w'1 was measured. The resultant swollen material was freeze-dried or dried in a desiccator with silica gel, and then weight w'2 was measured. An amount of liquid absorption w' and a swelling ratio Q' (weight of liquid contained in 1 g of polymer) were determined according to the following formulae:

$$w' = (w'1 - w'2)/(c/100);  \text{ and}$$

$$Q' = w'/(w'1 - w').$$

In the formulae, c is a concentration (wt %) of a saline solution used in respective experiments. The calculated swelling ratios Q' are listed in Table 1.

Table 1 shows that the smaller a concentration of a salt solution was, or the smaller an ionic strength was, the higher swelling ratio was.

TABLE 1

Relationship between concentration of saline solution and swelling property

| Concentration of Saline solution Wt % | 1 | 0.1 | 0.01 |
|---|---|---|---|
| Swelling Property g/g | 1.70 | 52.3 | 245 |

EXAMPLE 9

Bending of Ionic Crosslinked Polyrotaxane in an Electric Field

The ionic crosslinked polyrotaxane CPR-2 obtained in Example 6 was cut into a strip of 2.5×2.5×24 mm or 3×4×32 mm, and immersed in a 0.01M $Na_2CO_3$ aqueous solution. As shown in FIG. 1, electrodes 1 and 2 made of platinum plate were placed parallel, and a gel 3 was placed between electrodes so that the long side of the gel 3 is parallel to the electrodes (see FIG. 1($a$)).

As shown in FIG. 1($b$), when applying 35 V of voltage to the electrodes, the gel bent such that the both ends thereof came close to the negative electrode within 2 minutes. With continuing to apply the voltage, the bent gel got back the straight state over time (see FIG. 1($c$)), and with further continuing to apply the voltage, the gel bent such that the both ends thereof came close to the positive electrode (see FIG. 1($d$)).

For the sample cut into 3×4×32 mm, relationship of a degree of bending and time when applying 35 V of voltage is shown in FIG. 2. In FIG. 2, strain was defined as 6 $DY/L^2$, wherein Y was an amount of displacement (deflection) (mm) in which bending forward to the negative electrode was defined as positive, D was a width of gel (4 mm), and L was a length of gel (32 mm) (see FIG. 1($b$) for bending to the negative electrode). An amount of displacement Y when the both ends of the gel come close to the negative electrode was defined as positive (see, "Y" in FIG. 1($b$)).

Also, FIG. 2 shows that when applying a voltage, the gel firstly bent to the negative electrode, and got back to the straight state, and then bent to the positive electrode.

It is noted that if the direction of voltage was reversed when the sample bent to the negative electrode, the sample bent in the opposite direction and got back to the straight state faster than in the case of applying a voltage in a single direction (approximately 30 seconds to 1 minute faster).

COMPARATIVE EXAMPLE 1

Shiga et al., J. Appl. Polym. Sci. 44, 249-253 (1992) and Shiga et al., J. Appl. Polym. Sci. 47, 113-119 (1993) (the entire contents of which are incorporated herein by reference) have described that a gel using poly(vinyl alcohol)-poly(sodium acrylate) (PVA-PAA gel, a sample in a rod shape of approximately 8 mm diameter and 80 mm length) bend in an electric field of 10 to 30 V/cm ($Na_2C_3O$ aqueous solution). It is found that strain at the maximum bend is 0.2 and it requires approximately 2 minutes to bend to the maximum.

From comparison of Comparative Example 1 with Example 9, both samples were found to have similar degrees of strain (both have approximately 0.2) and similar bending velocity in an electric field. However, in Example 9, the sample can be made to bend under a lower electric field (Example 9: 7 V/cm; Comparative Example 1: 30 V/cm). That is, the ionic crosslinked polyrotaxane according to the present invention can be easily made to bend. This is thought to attribute to smooth sliding of the CD ring(s) on the polymer chain in the ionic crosslinked polyrotaxane obtained in Example 9.

Figure 1:
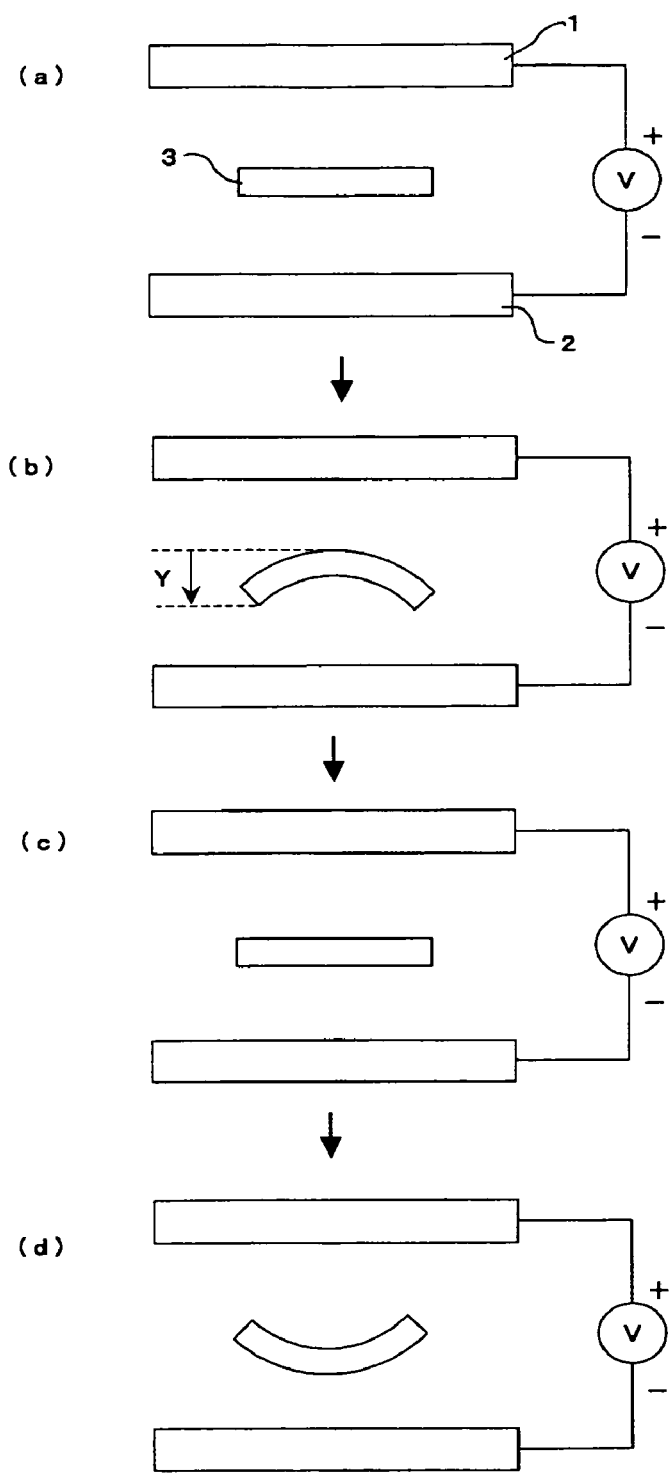
FIG. 1 shows schematic diagrams of change in form of the crosslinked polyrotaxane of Example 9 in an electric field.
Figure 2:
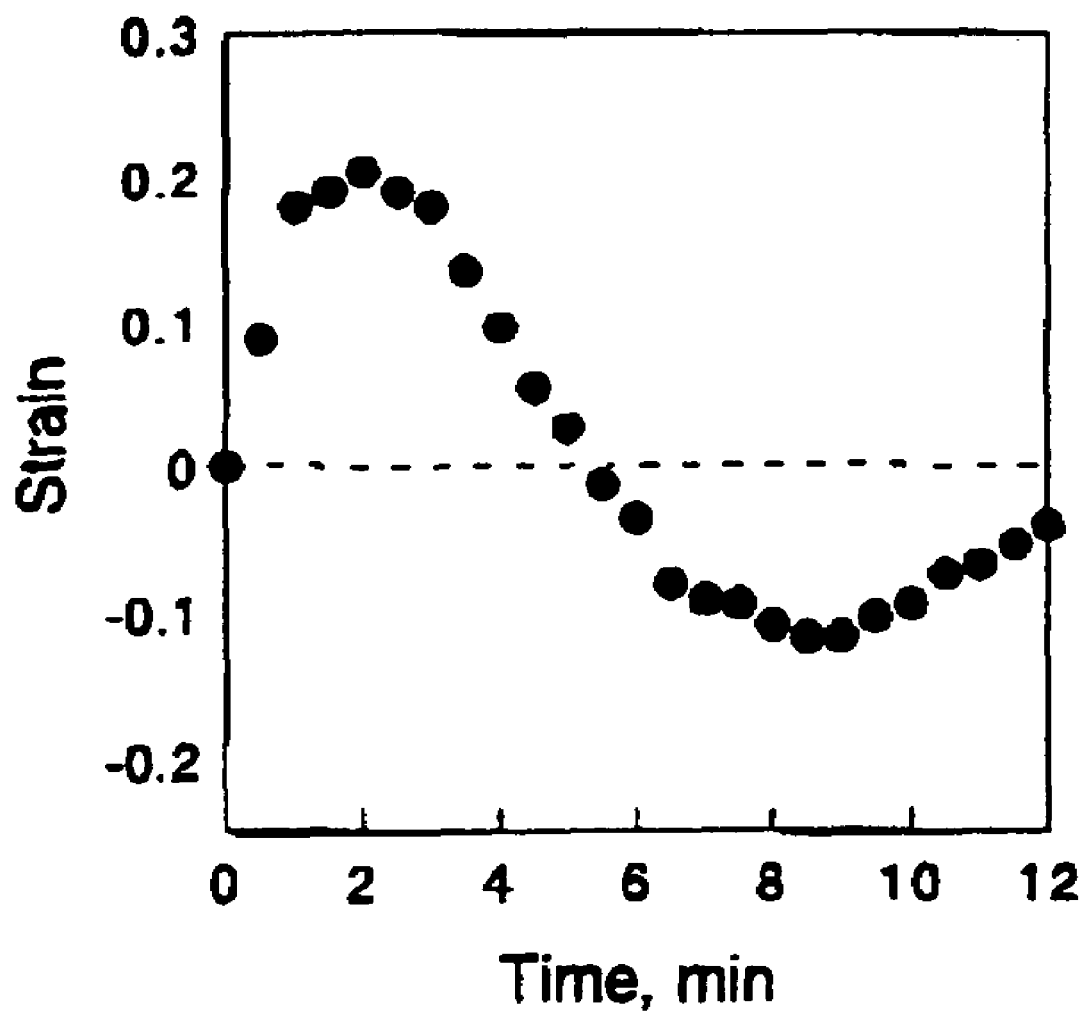
FIG. 2 shows a graph of relationship between a degree of bending of gel and time when applying 35 V of voltage to crosslinked polyrotaxane.

What is claimed is that:

1. A material comprising a crosslinked polyrotaxane, wherein the crosslinked polyrotaxane comprises at least two molecules of a polyrotaxane, which comprises a cyclic molecule(s), a linear molecule which is included in cavity (cavities) of the cyclic molecule(s) in a skewered manner, and a capping group which is located at each end of the linear molecule to prevent the dissociation of the cyclic molecule(s);
the cyclic molecule(s) in the at least two polyrotaxane molecules are bound to each other through a chemical bonding; and
the cyclic molecule has a hydroxy group(s) (—OH(s)), and a part of the hydroxy group(s) is substituted with a group having at least one ionic group selected from the group consisting of a —COOX group (wherein X represents a hydrogen atom (H), an alkaline metal or a mono-valent metal), an —$SO_3X$ group (wherein X has the same definition as described above), an —$NH_2$ group, and an —$NH_3X'$ group (wherein X' represents a monovalent halogen ion), a —$PO_4$ group, and an —$HPO_4$ group.

2. The material according to claim 1, wherein 10 to 90% of the total hydroxy groups of the total cyclic molecules may be substituted with the group having the ionic group(s).

3. The material according to claim 1, wherein the material absorbs a solvent in an amount of 1000 g or more per 1 g of the crosslinked polyrotaxane in an absolutely dried state.

4. The material according to claim 1, wherein the crosslinked polyrotaxane absorbs a solvent containing water and changes in volume with changes in pH and/or ionic strength of the solvent.

5. The material according to claim 1, wherein the crosslinked polyrotaxane absorbs a solvent containing water, and the crosslinked polyrotaxane having absorbed the solvent changes in shape and/or volume by an electric field.

6. The material according to claim 1, wherein the cyclic molecule is a cyclodextrin molecule.

7. The material according to claim 1, wherein the cyclic molecule is a cyclodextrin molecule, and the cyclodextrin molecule is selected from the group consisting of α-cyclodextrin, β-cyclodextrin and γ-cyclodextrin.

8. The material according to claim 1, wherein the linear molecule is selected from the group consisting of polyethylene glycol, polyisoprene, polyisobutylene, polybutadiene, polypropylene glycol, polytetrahydrofuran, polydimethylsiloxane, polyethylene and polypropylene.

9. The material according to claim 1, wherein the capping group may be selected from the group consisting of dinitrophenyl groups; cyclodextrins; adamantane groups; trityl groups; fluoresceins; pyrenes; substituted benzenes; polycyclic aromatics which may be substituted; and steroids.

10. The material according to claim 1, wherein the cyclic molecule is α-cyclodextrin, and the linear molecule is polyethylene glycol.

11. The material according to claim 1, wherein the linear molecule has the cyclic molecule included in a skewered manner at an amount of 0.001 to 0.6 of a maximum inclusion amount, which is defined as an amount at which the cyclic molecule can be included at maximum when the linear molecule has the cyclic molecules included in a skewered manner, and the amount at maximum is normalized to be 1.

12. The material according to claim 1, wherein at least two molecules of polyrotaxanes are chemically bound to each other by a crosslinking agent.

13. The material according to claim 12, wherein the crosslinking agent has a molecular weight of less than 2,000.

14. The material according to claim 12, wherein the crosslinking agent is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

15. The material according to claim 1, wherein at least one hydroxyl group of at least one cyclic molecule in each of the at least two molecules of the polyrotaxane is involved in crosslinking.

16. The material according to claim 1, wherein the linear molecule has a molecular weight of 10,000 or more.

17. A method for preparing a material which comprises a crosslinked polyrotaxane comprising the steps of:
1) preparing a pseudopolyrotaxane in which a linear molecule is included in the cavities of cyclodextrin molecules in a skewered manner by mixing cyclodextrin molecules and the linear molecule;
2) preparing a polyrotaxane by capping each end of the pseudopolyrotaxane with a capping group to prevent the dissociation of the cyclodextrin molecules; and
3) crosslinking at least two molecules of polyrotaxane via chemical bonding of cyclodextrin molecules in the at least two molecules of polyrotaxane through chemical bonding;
and further comprising the step of substituting a part of OH groups of the cyclodextrin molecules with an ionic group:
A) before the step 1) of preparing a pseudopolyrotaxane;
B) after the step 1) of preparing a pseudopolyrotaxane and before the step 2) of preparing a polyrotaxane;
C) after the step 2) of preparing a polyrotaxane and before the step 3) of crosslinking; and/or
D) after the step 3) of cross-linking.

18. The method according to claim 17, wherein the step of substituting is set after the step 2) of preparing a polyrotaxane and before the step 3) of cross-linking.

19. The method according to claim 17, wherein the ionic group is at least one selected from the group consisting of a —COOX group (wherein X represents a hydrogen atom (H), an alkaline metal, or a monovalent metal), an —$SO_3X$ group (wherein X has the same definition as described above), an —$NH_2$ group, an —$NH_3X'$ group (wherein X' represents a monovalent halogen ion), a —$PO_4$ group and a —$HPO_4$ group.

* * * * *